United States Patent [19]

Sugisawa et al.

[11] Patent Number: 4,777,057

[45] Date of Patent: Oct. 11, 1988

[54] PROCESS FOR MAKING A PACKAGED DOUGH FOR A BAKED CONFECTIONERY

[75] Inventors: Ko Sugisawa; Yasushi Matsumura, both of Nara; Hidefumi Okamoto; Yoshiyuki Miyaoku, both of Sakai; Shotaro Mogami, Kawasaki, all of Japan

[73] Assignee: House Food Industrial Company Limited, Higashiosaka, Japan

[21] Appl. No.: 772,902

[22] Filed: Sep. 5, 1985

[30] Foreign Application Priority Data

Sep. 5, 1984 [JP] Japan ................................. 59-186102

[51] Int. Cl.⁴ ............................................ A21D 10/02
[52] U.S. Cl. ..................................... 426/412; 426/128
[58] Field of Search ............... 426/128, 549, 407, 412, 426/399, 401

[56] References Cited

U.S. PATENT DOCUMENTS

| | | | |
|---|---|---|---|
| 1,411,223 | 3/1922 | Retzbach | 426/128 |
| 2,870,022 | 1/1959 | Anderson et al. | 426/128 |
| 3,015,568 | 1/1962 | McLain | 426/128 |
| 4,120,984 | 10/1978 | Richardson et al. | 426/412 |
| 4,357,356 | 11/1982 | Joulin | 426/19 |
| 4,493,850 | 1/1985 | Fioravanti | 426/412 |

OTHER PUBLICATIONS

Parade, Washington Post, Apr. 14, 1957 p. 16.

*Primary Examiner*—Donald E. Czaja
*Assistant Examiner*—Carolyn Paden
*Attorney, Agent, or Firm*—Oblon, Fisher, Spivak, McClelland & Maier

[57] ABSTRACT

This invention provides a packed semi-prepared dough for baked confectionery having good taste and pleasing texture, which can be easily prepared in households without special skill and can be stored over long periods.

The semi-prepared dough is prepared by charging a dough having a dough hardness of 18 to 470 BU into a heat-resistant packaging container and then preliminary heat-treating it after the container is sealed.

1 Claim, No Drawings

PROCESS FOR MAKING A PACKAGED DOUGH FOR A BAKED CONFECTIONERY

BACKGROUND OF THE INVENTION (1) Field of the Invention

The present invention relates to a semi-prepared dough for baked confectionery packaged in a container whereby so-called baked confectionery such as cookies, biscuits and so forth may be readily prepared in households and so forth simply by shaping and baking it.

(2) Description of the Prior Art

It is common for baked confectionery including cookies, biscuits and so on to be prepared in, for example, the following manner.

First, materials such as flour, oil, sugar and so forth are kneaded together to make dough. The dough is rolled into a sheet and then cut into desired shapes using a pastry cutter before it is finally baked in an oven.

In this case, however, skill is required in several steps, e.g. in the selection and measurement of materials and, especially in preparation of the dough, in kneading. Further, it is necessary for the dough to be set aside in a refrigerator or the like for a predetermined time and hardened in order to facilitate shaping. It is thus difficult to make baked confectionery having the desired taste and texture in an ordinary household.

SUMMARY OF THE INVENTION

Under such circumstances, the present inventors made a study for providing a container-packaged semi-prepared dough for baked confectionery that enables even persons without particular skill to prepare confectionery in households with ease and found that among the many physical properties of dough, its "hardness" is particulary important and that "a preliminary heat-treatment" is extremely effective for preparing the above mentioned baked confectionery. In other words, the present inventors found that when a dough is prepared so that it has a dough hardness of 18 to 470 BU, the dough is provided with an appropriate hardness which, together with the effect obtained by the preliminary heat-treatment, enables the shaping step which is performed by using a pastry cutter, or in other ways, to be carried out without any trouble and that the troublesome step of "aging" the dough after kneading can be omitted. Further, by providing the dough with the above mentioned hardness, a finished confectionery of high quality having an excellent shortness is obtained when the dough is baked in an oven or the like and, additionally, the dough possesses a desired shelf stability. The present invention is based on these findings as accomplished by the present inventors.

It is, therefore, a primary object of the present invention to provide a packed dough for baked confectionery of good taste and pleasing texture, including cookies, biscuits, and so on, which is capable of being prepared very easily in households and the like without requiring special skill.

Another object of this invention is to provide a semi-prepared dough for baked confectionery which keeps well and can therefore be stored over long periods for use whenever the need arises.

These and other objects of this invention will be clear from the following description.

In accordance with the present invention, there is provided a packaged semi-prepared dough for baked confectionery, wherein a dough having a dough hardness of 18 to 470 BU is charged into a heat-resistant container and preliminary heat-treated after the container is sealed.

DESCRIPTION OF THE PREFERRED EMBODIMENTS

The term "dough hardness" used for the dough according to the present invention is intended to mean the median of the maximum BU values of farinograms. The farinograms are obtained using the farinograph of Brabender as a measuring tool, by which each dough of 300 g contained in a conventional 300 g bowl is measured after being kneaded for ten minutes at 66 rpm using a sigma-shaped kneader blade at a temperature of 20° C.

Any of the materials generally used as ingredients in the dough employed for baked confectionery such as cookies, biscuits and so forth may be utilized as the ingredients of the dough according to the present invention.

Major materials usable for the dough include a ground grain such as flour, wheat starch, starch such as cornstarch and so on, saccharide such as sugar, glucose and so on, oil such as butter, margarine, beef tallow and so on. Further, ingredients such as hen's eggs and dairy products including milk, powdered milk, cheese, etc. may also properly be used. The general mixing ratios of the materials used for preparing the dough are shown in Table 1;

TABLE 1

| flour | 10–60 weight % |
|---|---|
| starch | 0–10 weight % |
| sugars | 0–40 weight % |
| egg | 0–42 weight % |
| oil and fat | 10–36 weight % |
| water* | residue |

*The resulting dough contains 10–29% by weight of water.

Ingredients not included in the foregoing but still usable in preparation of the dough for flavoring purposes are nuts such as almonds and so on, cocoa and chocolate. The proper use of vitamins and amino acids for enriching dough is also permitted as is the addition of various types of artificial food coloring and perfumes. These types of ingredients are respectively combined with the major ones in appropriate proportions according to the desired type or flavor of the baked confectionery. Then, the materials are kneaded together in a usual manner using, for example, a mixer or the like to make dough.

In the dough made according to the present invention, an emulsifying agent is also usable. It is preferable for an emulsifier to be added, since the emulsifier is able to suppress the propensity of the oil contained in the dough to float to its surface during storage of the dough and is also capable of improving the texture of the finished confectionery. Especially, the use of an emulsifier having a high hydrophilic nature such as sugar ester is advantageous, because it gives the baked confectionery a desirable shortness and smoothness.

A first aspect of the present invention resides in preparing a dough having a dough hardness of 18 to 470 BU.

When the hardness of the dough is controlled within this range, it is possible for the dough to have the appropriate physical properties for enabling an easy shaping process by such methods as using a pastry cutter after a preliminary heating process. It is also possible to provide a finished confectionery product which has a proper hardness and an excellent shortness.

If the dough hardness does not reach the lower limit of 18 BU, the stickiness of the dough cannot be sufficiently reduced by the preliminary heating process and such a dough sticks to rolling and shaping devices and exhibits physical properties which do not allow easy shaping. Furthermore, a dough having such an inadequate hardness may easily crumble during baking. Confectionery made by baking this type of dough is not firm enough and undesirably lacks shortness.

Should the hardness of the dough exceed the upper limit of 470 BU, it exhibits hardly any viscoelasticity after the preliminary heating process and becomes too hard, thus making difficult such shaping operations as cutting and rolling. Further, a confectionery baked from this type of dough is unable to provide good texture (it is excessively hard) and undesirably lacks shortness.

When the hardness of the dough is specified in the range of 30-300 BU, the heated dough is allowed to have such physical properties as hardness, viscoelasticity and so on which are most suitable for a shaping operation. The use of such a dough is advantageous in that it greatly improves the texture of the baked confectionery, including its shortness.

The hardness of the dough made according to the present invention may be controlled by, for example, either of or any combination of the following conditions and methods. However, the controlling method employed is not limited to those listed below, it being apparent that it can be freely selected by those who carry out the invention.

A method of controlling dough hardness by increasing or decreasing the amount of flour used or the amount of oil and fat used When the dough hardness is controlled by means of varying the amount of flour, the hardness increases as the amount of flour increases. With oil and fat, however, it works the other way around. It is desirable to control the dough hardness by varying the amount of flour, oil and fat within the amounts set forth in Table 1. It is not desirable to use much oil and fat because they are separated from the dough.

The amount of water to be added

Hardness of a dough is also controlled by varying the water content of the dough or the amount of certain ingredients which have a high water content, such as milk, eggs, and so on. In this case, it is desirable to control the dough hardness by varying the amount of water within the amount set forth in Table 1. Increase or decrease in the water content creates a phenomenon similar to that caused by varying the amounts of oil and fat. However, controlling with water is not more effective than with flour, oil and fat. When the water content of the dough is more than 29% by weight, the dough does not harden after preliminary heating, and as a result, it is difficult to carry out the cutting of the dough.

Kneading time

As the kneading time of a dough is prolonged, the production of wheat gluten is accelerated and, as a result, the dough is able to harden.

Selection of material

If the flour has a low gluten content, i.e., is a weak flour, dough hardness can be reduced, and this effect can also be achieved by increasing the amount of various types of starches employed. It is desirable that the amount of starches does not exceed 10% by weight because a confectionery baked from this type of dough is unable to provide good texture and lacks the desirable shortness.

A second aspect of the present invention resides in hermetically packaging the dough exhibiting a specific BU value in a heat-resistant container.

As the heat-resistant packaging container, a container made of glass, metal, plastic or any other material is usable as long as it has a sufficient heat-resistance during a subsequent preliminary heating process. To effectively suppress the storage deterioration (oxidation) of a contained oil and fat, however, it is preferable that a container be used which is made of a material having low permeability to gases or a high degree of light screening.

There are no particular restrictions on the shape of the container used in the present invention. However, it is advantageous if it has a flat shape since this will allow the dough to be shaped by cutting it by the user without any rolling. The appropriate size of a sheet of dough would be 3 to 10 mm in thickness and 10 to 20 cm in both width and length.

Furthermore, when the container has a flat shape, the dough contained therein can be uniformly heated through to its center during the subsequent preliminary heating process and heat passes through the dough effectively thereby reducing the preliminary heating time. It is also thereby possible to provide a dough having the desired physical properties without causing any deterioration of the dough quality (separation of contained oil and fat, etc.) or excessive hardening.

In a case where the container has a stick-like shape, e.g., a cylindrical shape having a diameter of 10 to 30 mm, the preliminary heating time can also be reduced and the shaping (cutting) becomes conveniently easier. Moreover, when the container has a shape like that of a cap, a bowl, a cone or a similar shape with a large diameter and the dough is packaged in such a container in such a state that a space is left at the upper part of the container, desired ingredients such as eggs, milk and so on can be added to the dough after the product according to the present invention is opened in the user's house or the like without the need for another container such as bowl or the like which is used for kneading. The added material is mixed with the dough and they are kneaded together in the container so that a dough of desired taste and texture can be prepared. Thus, the finished confectionery can be more of one's own making. Furthermore, an self-raising agent such as baking powder and yeast can be added at this time to increase the shortness of the finished confectionery.

A third aspect of the present invention resides in a preliminary heating process of the overall heat-resistant container in which the dough is hermetically packaged.

This preliminary heating process, together with the specification of the BU value of the dough is indispensable for improving the suitability of the dough for shaping as well as the texture of the finished confectionery.

In other words, after the preliminary heating process, the dough is given degrees of such physical properties as viscoelasticity, stickiness and hardness which are suitable for a shaping including rolling and cutting the dough into desired shapes.

Furthermore, the preliminary heating allows the finished confectionery to have an excellent shortness, thereby assuring a baked confectionery having a high quality texture without requiring any special skill.

In addition to the above effects, the preliminary heating process is effective in heat-sterilizing the dough as well as in reducing water activity, giving the dough a desired shelf stability. Thus, the dough can be kept in households or the like in readiness for making baked confectionery whenever required.

The preliminary heating process can be performed by any of the conventionally practiced heating methods, such as the steam boiling method, boiling water method and so on.

Standard conditions for the preliminary heating process are shown as follows: when the dough in the container is heated for 30 seconds to 90 minutes at a temperature of 60° to 135° C., it is possible for the dough to fully attain the above mentioned effects, i.e., suitability for shaping, improved texture and shelf stability. Heating of the dough at a temperature of 85° to 100° C. for 1 to 30 minutes enables the dough to have more suitable physical properties for shaping. The thus heated dough is also preferable for baking confectionery having excellent shortness. More preferably, heating is conducted at a temperature of 85° to 100° C. for 2 to 20 minutes. It is to be also noted that generally a dough containing a large amount of such ingredients as whole eggs, which have a heat solidifying protein content, can effect the improvement of the physical properties in a relatively short time of heating.

As regards the use of the thus prepared dough for baked confectionery according to the present invention, the container in which the dough is packed is opened and the dough is removed from the container for shaping into a desired thickness, shape and size through rolling, cutting and so on. The shaped dough is then baked in a baking device such as an oven, oven toaster or the like to obtain a baked confectionery such as biscuits, cookies and so forth.

The conditions for this baking may be freely decided by those who carry out the invention according to the desired degree of baking. They may be properly selected within normal baking conditions depending on the thickness, shape and size of the shaped dough. These normal baking conditions are concretely given as follows; the temperature would be about 160° to 240° C., more preferably, about 170° to 200° C., while the heating time is about 5 to 20 minutes, more preferably, about 10 to 15 minutes.

If the dough according to the present invention is of the type in which a desired material such as whole egg and so on can be added, as mentioned above, the added materials are mixed with the dough and the dough is further kneaded before the shaping takes place.

EXAMPLE 1

20 parts of margarine, 20 parts of shortening oil, 35 parts of sugar, 13 parts of frozen whole egg liquid, 0.2 parts of chocolate flavor and 5 parts of cocoa powder were charged in a mixer and stirred for about 1 minute. Then, 10 parts of wheat starch, 6 parts of unskimmed milk powder, 30 parts of flour (weak flour) and 8 parts of chopped almond were also charged in the mixer and kneaded together with the first mixture for about 1 minute to obtain a dough of BU 180. Next, 150 g of this dough was hermetically packaged in a sheet-like plastic container of 5 mm thickness and the entire container was subjected to a preliminary heating process by a steam boiling method for 12 minutes at a temperature of 90° C., whereby the packaged semi-prepared dough for baked confectionery according to the invention was obtained. This dough could be kept for a long time in normal temperatures. Further, because of its sheet-like shape, this dough could be formed into desired shapes simply by cutting and without requiring rolling while exhibiting such physical properties as hardness, viscoelasticity and so on which were suitable for cutting and therefore enabled a trouble free cutting operation.

This shaped dough was baked in an oven for 12 minutes and the finished chocolate cookie was of excellent taste and shortness.

COMPARATIVE EXAMPLE 1

A dough of BU 15 was prepared in the same manner as employed in Example 1 except that 10 parts, respectively, of both sugar and frozen whole egg liquid were used while the amount of water employed was changed to 28 parts.

The thus prepared dough was processed in the same manner as that for Example 1 and a chocolate cookie was obtained.

COMPARATIVE EXAMPLE 2

The dough having BU 504 was prepared in the same manner as for Example 1 except for 7 parts of margarine, 7 parts of shortening oil, 6 parts of sugar, 3 parts of frozen whole egg liquid, 1 part of unskimmed milk powder, 39 parts of flour and 37 parts of water were employed instead of the quantity of each material used in Example 1.

The thus prepared dough was processed in the same manner as that for Example 1 to obtain a chocolate cookie.

COMPARATIVE EXAMPLE 3

A chocolate cookie was obtained in the same manner as employed for Example 1 except that this cookie was not subjected to the preliminary heating process.

The packaged dough according to Example 1 and Comparative Examples 1 to 3 were compared with regard to their suitability for shaping. Also compared by means of a panel test was the texture of the finished confectionery products. The results of both comparisons are shown in Table 2.

TABLE 2

|  | Suitability for shaping | Texture |
| --- | --- | --- |
| Product according to the present invention (Example 1) | Hardness and viscoelasticity most suitable for shaping were obtained and cutting could be done without any trouble. | Showing excellent shortness, the confectionery was crisp and had a good texture. It also had a suitable hardness. |
| Product for comparison (Comparative Example 1) | Dough adhered to the shaping device, making the cutting difficult. | Without crispness, the finished confectionery was spongy, felt wet and had a bad texture. |
| Product for comparison (Comparative | The dough was excessively hard and was difficult to be cut. Many cracks occurred during shaping. | Was too hard and the least soft of the examples. Also lacked shortness. |

| | Suitability for shaping | Texture |
|---|---|---|
| Example 2) Product for comparison (Comparative Example 3) | The dough adhered to the shaping device and was very viscous. Cutting was very difficult. | Lacked shortness and was not crisp at all. |

EXAMPLE 2

21 parts of margarine, 20 parts of shortening oil, 30 parts of sugar and 0.3 parts of vanilla oil were charged in a mixer and kneaded for about 1 minute. Then, 12 parts of wheat starch, 4.6 parts of unskimmed milk powder and 45 parts of wheat flour (weak flour) were added and kneaded for about another 1 minute to obtain a dough of BU 170. Next, 150 g portions of the thus made dough were individually packaged in plastic casings using a continuous packing ligating machine and then subjected to a preliminary heating for 15 minutes at a temperature of 85° C. by a boiling water process to obtain a semi-prepared packaged dough for baked confectionery according to the present invention.

This dough could be kept for long periods at normal temperatures. The dough has a stick-like shape so that it can be shaped simply by cutting it into desired thicknesses.

The dough shaped in this manner was then baked in an oven for 12 minutes at a temperature of 170° C. and the resulting plain type cookie had a good taste and shortness.

What is claimed is:

1. A process for preparing a packaged dough for a baked confectionery, which comprises the steps of: preparing a dough having a dough hardness of 30 to 300 BU from a composition comprising 10–60% by weight of flour, 0–10% by weight of starch, 0–40% by weight of sugars, 0–42% by weight of egg, 10–36% by weight of oil and fat, and 10–29% by weight of water, charging the dough into a heat-resistant packaging container, hermetically sealing the container, and subjecting it to a preliminary heat-treatment by the steam boiling method or the boiling water method at a temperature of 60° to 135° C. for 30 seconds to 90 minutes after the container is sealed whereby the dough is rendered semi-prepared and acquires physical properties of viscoelasticity, stickiness, and hardness which are suitable for shaping the dough and whereby the dough does not stick to a cutter when it is cut.

* * * * *